United States Patent
Gruenstein

(10) Patent No.: US 10,546,236 B2
(45) Date of Patent: Jan. 28, 2020

(54) TRAINING MULTIPLE NEURAL NETWORKS WITH DIFFERENT ACCURACY

(71) Applicant: Google LLC, Mountain View, CA (US)

(72) Inventor: Alexander H. Gruenstein, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/260,460

(22) Filed: Sep. 9, 2016

(65) Prior Publication Data

US 2016/0379113 A1 Dec. 29, 2016

Related U.S. Application Data

(62) Division of application No. 14/285,801, filed on May 23, 2014, now Pat. No. 9,484,022.

(51) Int. Cl.
*G06N 3/08* (2006.01)
*G10L 15/16* (2006.01)
*G06N 3/04* (2006.01)

(52) U.S. Cl.
CPC ............ *G06N 3/08* (2013.01); *G06N 3/0454* (2013.01); *G06N 3/0472* (2013.01); *G10L 15/16* (2013.01)

(58) Field of Classification Search
CPC ........... G06N 3/08; G06N 3/054; G10L 15/16
USPC ........................................................ 706/20
See application file for complete search history.

(56) References Cited

U.S. PATENT DOCUMENTS

| 5,025,471 A | 6/1991 | Scott |
| 5,257,314 A | 10/1993 | Kimura |
| 5,515,475 A | 5/1996 | Gupta |
| 5,621,858 A | 4/1997 | Stork |
| 5,642,519 A | 6/1997 | Martin |
| 5,737,485 A | 4/1998 | Flanagan |
| 5,751,904 A | 5/1998 | Inazumi |
| 6,070,139 A * | 5/2000 | Miyazawa ............ G10L 15/065 704/270 |
| 6,092,045 A | 7/2000 | Stubley |
| 6,224,636 B1 | 5/2001 | Wegmann |

(Continued)

OTHER PUBLICATIONS

Torkkola et al, "Using the Topology-Preserving Properties of SOFMs in Speech Recognition", ICASSP-91, International Conference on Accoustic, Speech, anhd Signal Processings, Apr. 14-17, 1991, IEEE.*

(Continued)

*Primary Examiner* — Li B. Zhen
*Assistant Examiner* — Tsu-Chang Lee
(74) *Attorney, Agent, or Firm* — Fish & Richardson P.C.

(57) ABSTRACT

Methods, systems, and apparatus, including computer programs encoded on computer storage media, for training a deep neural network. One of the methods includes generating a plurality of feature vectors that each model a different portion of an audio waveform, generating a first posterior probability vector for a first feature vector using a first neural network, determining whether one of the scores in the first posterior probability vector satisfies a first threshold value, generating a second posterior probability vector for each subsequent feature vector using a second neural network, wherein the second neural network is trained to identify the same key words and key phrases and includes more inner layer nodes than the first neural network, and determining whether one of the scores in the second posterior probability vector satisfies a second threshold value.

21 Claims, 9 Drawing Sheets

(56) References Cited

U.S. PATENT DOCUMENTS

| | | | |
|---|---|---|---|
| 6,253,178 B1 | 6/2001 | Robillard | |
| 6,324,532 B1* | 11/2001 | Spence | G06K 9/3241 |
| | | | 706/19 |
| 6,560,360 B1* | 5/2003 | Neskovic | G06K 9/00872 |
| | | | 382/181 |
| 7,058,573 B1 | 6/2006 | Murveit | |
| 8,442,821 B1 | 5/2013 | Vanhoucke | |
| 8,645,138 B1 | 2/2014 | Weinstein | |
| 8,982,942 B2 | 3/2015 | Gao | |
| 2002/0186875 A1* | 12/2002 | Burmer | G06K 9/00127 |
| | | | 382/133 |
| 2006/0149692 A1* | 7/2006 | Hercus | G06N 3/082 |
| | | | 706/15 |
| 2010/0217589 A1 | 8/2010 | Gruhn | |
| 2011/0276526 A1* | 11/2011 | Turbin | G01T 1/28 |
| | | | 706/17 |
| 2012/0245934 A1 | 9/2012 | Talwar et al. | |
| 2015/0255061 A1 | 9/2015 | Xue | |
| 2015/0269933 A1* | 9/2015 | Yu | G10L 15/16 |
| | | | 704/232 |

OTHER PUBLICATIONS

Hinton et al., "Deep Neural Networks for Accoustic Modeling in Speech Recognition", IEEE Signal Processing Magazine, Nov. 2012.*

Torkkola et al, "Using the Topology-Preserving Properties of SOFMs in Speech Recognition", ICASSP-91, International Conference on Accoustic, Speech, anhd Signal Processing, Apr. 14-17, 1991, IEEE.*

Hinton et al., "Deep Neural Networks for Aoustic Modeling in Speech Recognition", IEEE Signal Processing Magazine, Nov. 2012.*

Basu et al., "Use of Artificial Neural Network in Pattern Recognition", International Journal of Software Engineering and its Applications, vol. 4, No. 2, Apr. 2010.*

Hashem, et al., "Improving Model Accuracy Using Optimal Linear Combinations of Trained Neural Networks", IEEE Transactions on Neural Networks, vol. 6, No. 3, May 1995 (Year: 1995).*

Broder, Andrei Z. et al., "Efficient Query Evaluation Using a Two-Level Retrieval Process," CIKM '03, Nov. 3-8, 2003, New Orleans, Louisiana, USA, Copyright 2003 ACM 1-58113-723-0/03/0011, 9 pages.

Nguyen, Hanh H. et al., "Multiple Neural Networks for a Long Term Time Series Forecast," Neural Comput & Applic (2004), 13:90-98, DOI 10.1007/s00521-003-0390-z, 9 pages.

Sarcia, Salvatore A. et al., "Auto-Associative Neural Networks to Improve the Accuracy of Estimation Models," *Artificial Intelligence Applications for Improved Software Engineering Development: New Prospects*, eds: Farid Meziane and Sunil Valeda, IGI Global, USA, 2010, 18 pages.

* cited by examiner

TRAINING MULTIPLE NEURAL NETWORKS WITH DIFFERENT ACCURACY

CLAIM OF PRIORITY

This application claims priority under 35 USC § 120 to U.S. patent application Ser. No. 14/285,801, filed on May 23, 2014, the entire contents of which are hereby incorporated by reference.

BACKGROUND

Automatic speech recognition is one technology that is used in mobile devices. One task that is a common goal for this technology is to be able to use voice commands to wake up and have basic spoken interactions with the device. For example, it may be desirable to recognize a "hotword" that signals that the mobile device should activate when the mobile device is in a sleep state.

SUMMARY

In general, one innovative aspect of the subject matter described in this specification can be embodied in methods that include the actions of receiving a digital representation of speech, generating a plurality of feature vectors that each model a different portion of an audio waveform from the digital representation of speech during a different period of time, the plurality of feature vectors including a first feature vector and subsequent feature vectors, generating a first posterior probability vector for the first feature vector using a first neural network, the first posterior probability vector including one score for each key word or key phrase which the first neural network is trained to identify, determining whether one of the scores in the first posterior probability vector satisfies a first threshold value using a first posterior handling module, and in response to determining that one of the scores in the first posterior probability vector satisfies the first threshold value and for each of the feature vectors generating a second posterior probability vector for the respective feature vector using a second neural network, wherein the second neural network is trained to identify the same key words and key phrases as the first neural network, and includes more inner layer nodes than the first neural network, and the second posterior probability vector includes one score for each key word or key phrase which the second neural network is trained to identify, and determining whether one of the scores in the second posterior probability vector satisfies a second threshold value using a second posterior handling module, the second threshold value being more restrictive than the first threshold value. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include storing the first feature vector in a memory, and providing the first feature vector from the memory to the second neural network in response to determining that one of the scores in the first posterior probability vector satisfies the first threshold value. The method may include performing an action in response to determining that the values at the same index location in a sequence of the fourth posterior probability vectors satisfy the second threshold value. The method may include generating a third posterior probability vector for each of the subsequent feature vectors using the first neural network, and determining whether one of the scores in each of the third posterior probability vectors satisfies the first threshold value using the first posterior handling module until the first posterior handling module determines that none of the scores in an particular third posterior probability vector satisfies the first threshold value. The second neural network may generate the second posterior probability vector and the second posterior handling module may determine whether one of the scores in the second posterior probability vector satisfies the second threshold value for each of the subsequent feature vectors until the first posterior handling module determines that none of the scores in the particular third posterior probability vector satisfies the first threshold value.

In some implementations, the second neural network receives each of the subsequent feature vectors from a front-end feature extraction module or the first neural network. The method may include identifying a predetermined clock frequency for a processor to perform the generation of the first posterior probability vector for the first feature vector using the first neural network. The processor may be a digital signal processor. The predetermined clock frequency may be identified by the first neural network.

In some implementations, the first neural network includes a higher false positive rate than the second neural network. The first posterior handling module and the second posterior handling module may be the same posterior handling module. The first threshold value and the second threshold value may be decimal values between zero and one. The first threshold value may be a lower number than the second threshold value. The first threshold value may be 0.1 and the second threshold value may be 0.2. The second neural network may be more accurate than the first neural network.

In general, one innovative aspect of the subject matter described in this specification can be embodied in methods that include the actions of training a first neural network to identify a set of features using a first training set, the first neural network including a first quantity of nodes, training a second neural network to identify the set of features using a second training set, the second neural network including a second quantity of nodes, greater than the first quantity of nodes, and providing the first neural network, and the second neural network to a user device that uses both the first neural network and the second neural network to analyze a data set and determine whether the data set includes a digital representation of a feature from the set of features. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The set of features may include key words and key phrases. The user device may use both the first neural network and the second neural network to analyze an audio waveform and determine whether a digital representation of one of the key words or the key phrases from the set of features is included in the audio waveform. The method may include providing a feature extraction module, a first posterior handling module, and a second posterior handling module to the user device with the first neural network and the second neural network, wherein the user device uses the feature extraction module, the first posterior handling module, and the second posterior handling module to perform the analysis of the data set. The first posterior handling module and the second posterior handling module may be the same posterior handling module.

In some implementations, the set of features includes computer vision features, handwriting recognition features, text classification features, or authentication features. The first training set and the second training set may be the same training set. The method may include training the first neural network for a first quantity of iterations, and training the second neural network for a second quantity of iterations, greater than the first quantity of iterations. A ratio between the first quantity of nodes and the second quantity of nodes may identify a performance cost savings of the user device when the user device analyzes a particular portion of the data set with the first neural network and not the second neural network.

The subject matter described in this specification can be implemented in particular embodiments so as to realize one or more of the following advantages. In some implementations, the use of a coarse deep neural network for an initial analysis of feature vectors and a deep neural network for a second analysis of the feature vectors that the coarse deep neural network indicates meet a threshold level of relevance may reduce central processing unit (CPU) usage, power consumption, and/or network bandwidth usage.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A coarse deep neural network is trained with a training set of feature vectors that model audio waveforms of words or sub-word units to identify a probability that a feature vector corresponds with a particular key phrase, represented by the words or sub-word units. Another deep neural network, with more hidden nodes, is trained with the same training set of feature vectors to identify another probability that the feature vector corresponds with the same particular key phrase, e.g., "Okay Google."

The other deep neural network is more accurate than the coarse deep neural network because the other deep neural network includes more nodes and may be trained using more iterations than the coarse deep neural network. For instance, the coarse deep neural network may have a higher false positive rate than the other deep neural network.

A system may use the coarse deep neural network for an initial analysis of a feature vector to reduce the use of the other deep neural network when analyzing feature vectors. For example, only feature vectors that the coarse deep neural network identifies as relevant are analyzed by the more accurate other deep neural network.

Figure 1:
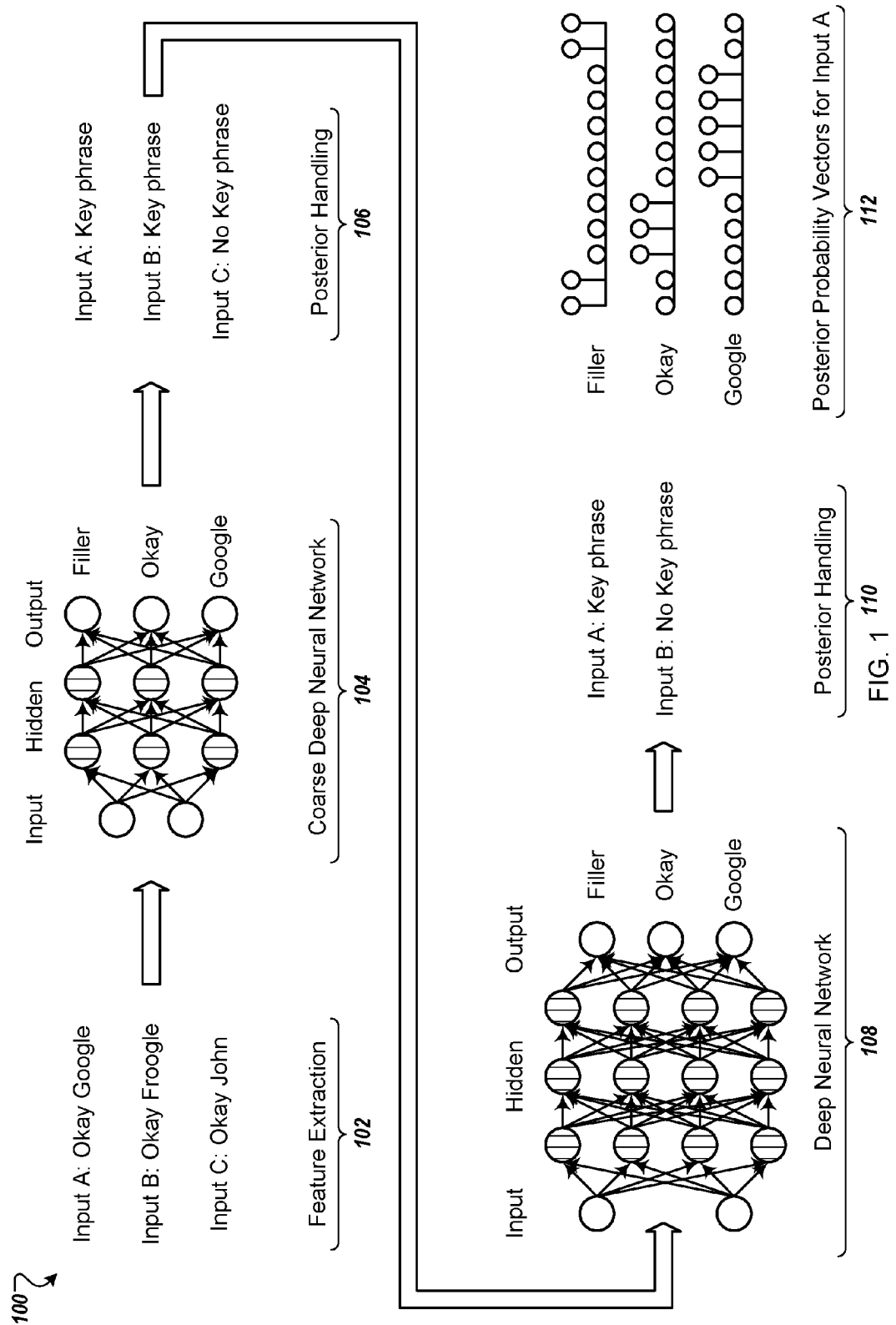
FIG. 1 shows an example of a speech recognition system in which a coarse deep neural network analyzes multiple feature vectors for separate digital representations of speech.

FIG. 1 shows an example of a speech recognition system 100 in which a coarse deep neural network 104 analyzes multiple feature vectors for separate digital representations of the phrases "Okay Google," "Okay Froogle," and "Okay John." For example, a feature extraction module 102 receives three digital representations of speech, e.g., at different times, and performs feature extraction for each of the digital representations of speech to generate the feature vectors.

The speech recognition system 100 then analyzes the generated feature vectors using the coarse deep neural network 104 to determine whether the digital representations of speech include phrases similar to the key phrases. For instance, the coarse deep neural network 104 is not as accurate as a deep neural network 108 and may generate posterior probability vectors that indicate that the feature vectors for both "Okay Google" and "Okay Froogle" have a high probability of corresponding with the key phrase "Okay Google," while another posterior probability vector indicates that "Okay John" has a low probability of corresponding with the key phrase.

The speech recognition system 100 provides the posterior probability vectors generated by the coarse deep neural network 104 to a posterior handling module 106 which uses the values in the posterior probability vectors to determine whether the corresponding digital representation of speech contains any of the key phrases for which the coarse deep neural network 104 is trained. In this example, the posterior handling module 106 determines that input A, "Okay Google," and input B, "Okay Froogle," have high probabilities of including the key phrase "Okay Google," for which the coarse deep neural network 104 was trained, and that the input C, "Okay John," has a low probability of including the key phrase, e.g., and input C, "Okay John," is not similar to any other key phrases for which the coarse deep neural network 104 is trained.

For the feature vectors that the posterior handling module 106 determines have a high probability of including a key phrase, or a portion of a key phrase, the speech recognition system 100 provides the feature vectors to the deep neural network 108 for further analysis. Since the deep neural network 108 is more accurate, the deep neural network 108 generates second posterior probability vectors that represent a high probability that the feature vectors for input A, "Okay Google," correspond with feature vectors for the key phrase "Okay Google," while third posterior probability vectors represent a low probability that the feature vectors for input B, "Okay Froogle," correspond with the feature vectors for the key phrase.

The deep neural network 108 provides the second and third posterior probability vectors to another posterior handling module 110, which analyzes the values in the second and third posterior probability vectors to determine whether the corresponding digital representations of speech included the key phrase. The other posterior handling module 110 may analyze multiple sequential posterior probability vectors received from the deep neural network 108 when determining whether a particular digital representation of speech includes a key phrase.

The use of the coarse deep neural network 104 to perform a first pass analysis of the feature vectors reduces the analysis of feature vectors by the deep neural network 108. For example, the coarse deep neural network 104 may determine that about 2% of feature vectors correspond with audio that has a high likelihood of including a key phrase and the deep neural network 108 will only need to analyze those determined feature vectors instead of all feature vectors. Further, since the coarse deep neural network 104 does not include as many nodes as the deep neural network 108, the coarse deep neural network 104 requires less computation, e.g., less CPU usage, and reduces the power consumed by a device when analyzing audio to identify the particular key phrases.

In instances where the deep neural network 108 executes on a device remote from a device executing the coarse deep neural network 104, the use of the coarse deep neural network 104 may reduce the network bandwidth used. For example, only feature vectors identified by the coarse deep neural network 104 as having a high probability of corresponding with a key phrase are sent to the remote device for additional analysis by the deep neural network 108.

A user device may use the coarse deep neural network 104 and the deep neural network 108 to analyze received audio waveforms and determine if a sequence of frames from an audio waveform include a digital representation of one of the specific keywords or key phrases for which both deep neural networks were trained. When the deep neural network 108 determines that a sequence of frames contains a digital representation of one of the specific keywords or key phrases, or has probability that satisfies a threshold probability that the sequence of frames contains a digital representation of one of the specific keywords or key phrases, the user device may perform an action that corresponds with the one of the specific keywords or key phrases. For instance, the user device may exit a standby state, launch an application, or perform another action.

The feature extraction module 102 performs voice-activity detection and generates a feature vector for every frame of audio data, e.g., from an audio waveform. For example, the speech recognition system 100 may receive a digital representation of speech, e.g., as a continuous stream of data, and split the stream into multiple frames of data, e.g., where each frame is associated with 10 milliseconds of audio stream data.

The feature extraction module 102 may analyze each of the frames to determine feature values for the frames and places the features values in feature vectors which can be stacked, e.g., using left and right context of adjacent feature vectors, to create a larger feature vector.

A feature vector, for a single frame or a stacked vector for multiple frames, is provided to the coarse deep neural network 104 that is trained to predict posterior probabilities from the features values included in a feature vector. The posterior probabilities correspond with entire words or sub-word units for the keywords or key phrases and represent the probability that a keyword or key phrase is included in a frame or multiple consecutive frames.

The posterior handling module 106 may combine the posterior probabilities from multiple feature vectors into a confidence score used to determine whether or not a keyword or a key phrase was included in the digital representation of speech, e.g., included in the frames that correspond with the feature vectors.

For example, the speech recognition system 100 may receive a digital representation of speech for a window of time where the digital representation of speech includes data representing the key phrase "Okay Google". The speech recognition system 100 divides the window into twelve frames. The feature extraction module 102 determines features values for each of the twelve frames, creates feature vectors with the corresponding feature values for the twelve frames, and provides the twelve feature vectors to the coarse deep neural network 104.

In some implementations, the coarse deep neural network 104 or the deep neural network 108 are trained to identify probabilities for three categories of content including the probability that a feature vector corresponds with the keywords "Okay", and "Google", and the probability that the feature vector does not correspond with either of the keywords, e.g., and is "filler," as shown by posterior probability vectors 112 for the input A. The coarse deep neural network 104 analyzes each of the twelve feature vectors and generates frame-level posterior probabilities for each of the three categories and provides the frame-level posterior probabilities to the posterior handling module 106.

The posterior handling module 106 may combine the probabilities for the frames to determine a final confidence score for the received window. For example, the posterior handling module 106 combines the probabilities and determines that the window included "filler" in the first two frames, the keyword "Okay" in the next three frames, e.g., where each of the frames is associated with a different portion of the keyword, the keyword "Google" in frames six through ten, and "filler" in the remaining two frames. The determination may be specific to a particular frame or for the entire window.

In some implementations, the feature extraction module 102 analyzes only the portions of a digital representation of speech that are determined to include speech to reduce computation. For example, the feature extraction module 102 may include a voice-activity detector that may use thirteen-dimensional perceptual linear prediction (PLP) features and their deltas and double-deltas as input to a thirty-component diagonal covariance Gaussian Markov Model, to generate speech and non-speech posteriors for each frame. The feature extraction module 102 may perform temporal smoothing on the speech and non-speech posteriors to identify regions where the speech posteriors exceed a threshold and the corresponding frame is likely to include speech.

For frames that include speech regions, the feature extraction module 102 may generate acoustic features based on forty-dimensional log-filterbank energies computed every ten milliseconds over a window of twenty-five milliseconds. The feature extraction module 102 may stack contiguous frames to add sufficient left and right context, e.g., as the speech recognition system 100 receives additional data and the analysis of the frames progresses, and provide feature vectors for the stack of frames to the coarse deep neural network 104. For example, the input window may be asymmetric since each recently received frame may add about ten milliseconds of latency to the speech recognition system 100. In some implementations, the speech recognition system 100 stacks ten recently received frames and thirty previously received frames.

The coarse deep neural network 104 and/or the deep neural network 108 may be feed-forward fully connected neural networks with k hidden layers and n hidden nodes per layer where each node computes a non-linear function of the weighted sum of the output of the previous layer, e.g., with different values fork and/or n for the coarse deep neural network 104 and the deep neural network 108. In some implementations, some of the layers may have a different number of nodes.

The nodes in the output layer may use softmax activation functions to determine an estimate of the posterior probability of each output category. The nodes in the hidden layers of the coarse deep neural network 104 and/or the deep neural network 108 may use rectified linear unit (ReLU) functions to determine output using the received input from the previous layer or the values from the feature vectors, e.g., for the initial layer of nodes.

In some implementations, the size of the coarse deep neural network 104 and/or the deep neural network 108 is determined based on the number of output categories, e.g., keywords and/or key phrases and filler.

The output categories of the coarse deep neural network 104 and the deep neural network 108 can represent entire words or sub-word units in a keyword or a key phrase. For instance, during keyword or key phrase detection, the output categories of the coarse deep neural network 104 can represent entire words. The deep neural networks may receive the output categories during training and the output categories may be context dependent, e.g., specific to a particular device, software application, or user. For example, the output categories may be generated at training time via forced alignment using a standard Gaussian mixture model based large vocabulary continuous speech recognition system, e.g., a dictation system.

The coarse deep neural network 104 and the deep neural network 108 are trained to determine a posterior probability $p_{i_j}$ for the $i^{th}$ output category and the $j^{th}$ frame $x_j$, where the values of i are between 0 and n−1, with n the number of total categories. In some implementations, 0 corresponds with the category for non-keyword content, e.g., content that corresponds with the "filler" category. The parameters, e.g., the weights and biases, of the neural networks, θ, may be estimated by maximizing the cross-entropy training criterion over the labeled training data $\{x_j, i_j\}_j$ using Equation (1) below.

$$F(\theta) = \Sigma_j \log(p_{i_j j}) \quad (1)$$

In some implementations, the neural networks may be trained with a software framework that supports distributed computation on multiple CPUs in deep neural networks. In some implementations, one or both of the deep neural networks are trained using asynchronous stochastic gradient descent with an exponential decay for the learning rate.

In some implementations, some of the deep neural networks parameters are initialized with the corresponding parameters of an existing deep neural network of the same size and similar type of training dataset, and are not trained from scratch. For example, the deep neural network 108 may be previously trained for speech recognition with a suitable initial training set to initialize the hidden layers of the deep neural network where the parameters for all layers of the deep neural network 108 are updated during training. The deep neural network 108 is then trained using a second training set, potentially smaller than the initial training set that includes data for the output categories, e.g., the specific keywords and key phrases which the deep neural network 108 will identify.

In some implementations, a first training set includes features values for uttered speech with output values relevant to large vocabulary dictation. A neural network for large vocabulary continuous speech recognition (LVCSR) may produce these output values e.g., as sub-word units. For instance, sub-word units may be n-grams, triphones, or variable length phoneme sequences. In one example, a LVCSR system, e.g., executing on a server, may have 14K states, e.g., compared to a smaller embedded system which may have 2K states. The number of states may be selected by considering all triphones possible and pruning them to the most frequent triphones found in a respective language, e.g., English, using a Decision Tree. The deep neural network 108 may then be trained with the second training set that includes feature values for speech uttered in the same language as the speech represented by the first training set.

Some of the parameters of the deep neural network 108 may remain constant when the deep neural network 108 is trained with the second training set. For instance all of the parameters for a particular layer, other than the output layer, may be held constant while training the deep neural network 108 with the second training set. In some examples, the parameters for two or more nodes in different layers may be held constant while training the deep neural network 108 with the second training set. This form of training may allow the hidden layers to learn a better and more robust feature representation by exploiting larger amounts of data and avoiding bad local optima.

For example, the deep neural network 108 may be trained initially using three-thousand hours of speech, where all of the parameters of the deep neural network 108 are adjusted during training. The deep neural network 108 may then be trained using examples for each keyword, e.g., "Okay" and "Google," and using negative examples, e.g., for the "filler" category, where some of the parameters of the deep neural network 108 are adjusted while others remain constant.

The negative examples may include anonymized voice search queries or other short phrases. In some examples, the deep neural network 108 is trained using about one thousand to about two thousand, e.g., 2.2-2.3 k, keyword or key phrase training examples in the second training set. In some examples, the deep neural network 108 is trained using between about 1 k to about 40 k keyword or key phrase training examples in the second training set. In some examples, the deep neural network 108 is trained using about 70 k to about 133 k negative examples in the second training set.

When the deep neural network 108 is trained with the second training set, for the specific keywords and/or key phrases, the deep neural network 108 may discard the output layer generated with the first training set and create a new output layer, e.g., with one output node for each keyword and key phrase, and optionally one output node for "filler".

The deep neural network 108 may be trained to determine posterior probabilities for specific keywords, key phrases, key sub-word units, or a combination of the three. In some implementations, the deep neural network 108 may trained to determine a posterior probability for a keyword that is also included in a key phrase. For example, the other posterior handling module 110 may combine the posterior probabilities for two key words to determine a probability for a key phrase.

The deep neural networks provide the posterior probabilities to the posterior handling modules. One or both of the posterior handling modules may smooth the posterior probabilities over a fixed time window of size $W_{smooth}$ to remove noise from the posterior probabilities, e.g., where posterior probabilities corresponding with multiple frames are used to determine whether a keyword was included in a window. The window size $W_{smooth}$ may be different for each of the posterior handling modules. To generate a smoothed posterior probability $p'_{i_j}$ from the posterior probability $p_{i_j}$, for the $i^{th}$ output category and the $j^{th}$ frame $x_j$, where the values of i are between 0 and n−1, with n the number of total categories, the posterior handling modules may use Equation (2) below.

$$p'_{i_j} = \frac{1}{j - h_{smooth} + 1} \sum_{k=h_{smooth}}^{j} p_{ik} \quad (2)$$

In Equation (2), $h_{smooth}=\max\{1, j-w_{smooth}+1\}$ is the index of the first frame within the smoothing window. In some implementations, $w_{smooth}=30$ frames.

The posterior handling modules may determine a confidence score for the $j^{th}$ frame $x_j$ within a sliding window of size $w_{max}$ using Equation (3) below.

$$confidence = \sqrt[n-1]{\prod_{i=1}^{n-1} \max_{h_{max} \leq k \leq j} p'_{ik}} \quad (3)$$

In Equation (3), $p'_{i_j}$ is the smoothed state posterior, and $h_{max}=\max\{1, j-w_{max}+1\}$ is the index of the first frame within the sliding window. In some implementations, $w_{max}=100$. In some implementations, when Equation (3) does not enforce the order of the sub-word unit sequence, stacked feature vectors are fed as input to the deep neural networks to help encode contextual information.

In some implementations, the speech recognition system 100 is a large vocabulary conversational speech recognition system.

Figure 2:
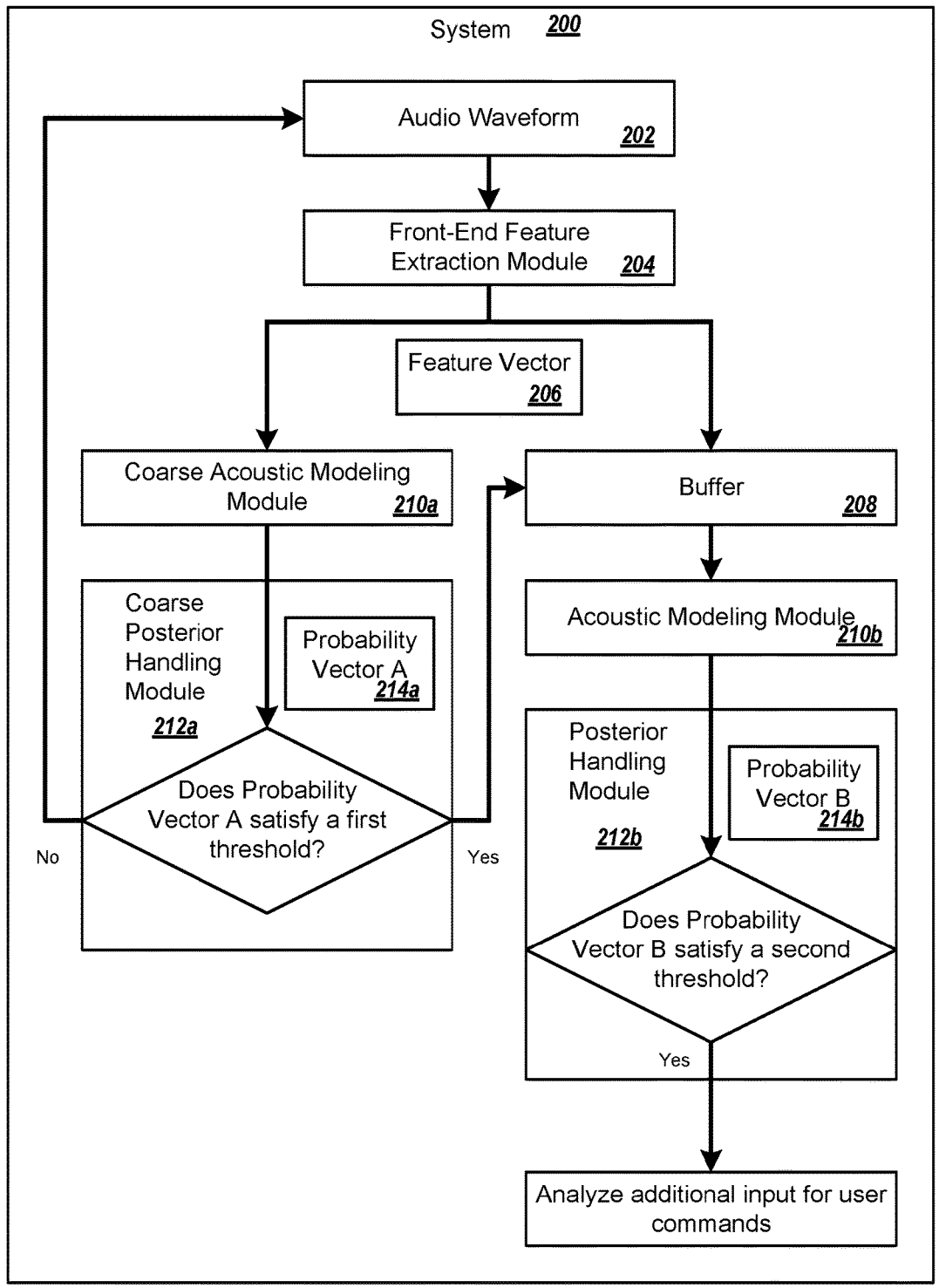
FIG. 2 is an example system for determining whether an audio waveform contains a digital representation of a specific keyword or key phrase.

FIG. 2 is an example system 200 for determining whether an audio waveform contains a digital representation of a specific keyword or key phrase. The system 200, e.g., the speech recognition system 100, receives an audio waveform 202 and provides the audio waveform 202 to a front-end feature extraction module 204. For example, a microphone may capture an analog or digital representation of sound as the audio waveform 202 from a physical environment, e.g., that contains the microphone. The system 200 may include the microphone or another system may include the microphone and send the audio waveform 202 to the system 200.

The front-end feature extraction module 204 analyzes the audio waveform 202 to generate a series of feature vectors, described with reference to FIG. 3. Once the front-end feature extraction module 204 has finished the processing of the audio waveform 202, the front-end feature extraction module 204 stores an feature vector 206 in a buffer 208 and sends the features vector 206 to a coarse acoustic modeling module 210a.

The coarse acoustic modeling module 210a may use a variety of techniques, described with reference to FIG. 4, to analyze the feature vectors and produce posterior probability vectors 214a that are representative of whether or not portions of the audio waveform 202 contain specific words or phrases for which the coarse acoustic modeling module 210a is programmed.

Figure 5:
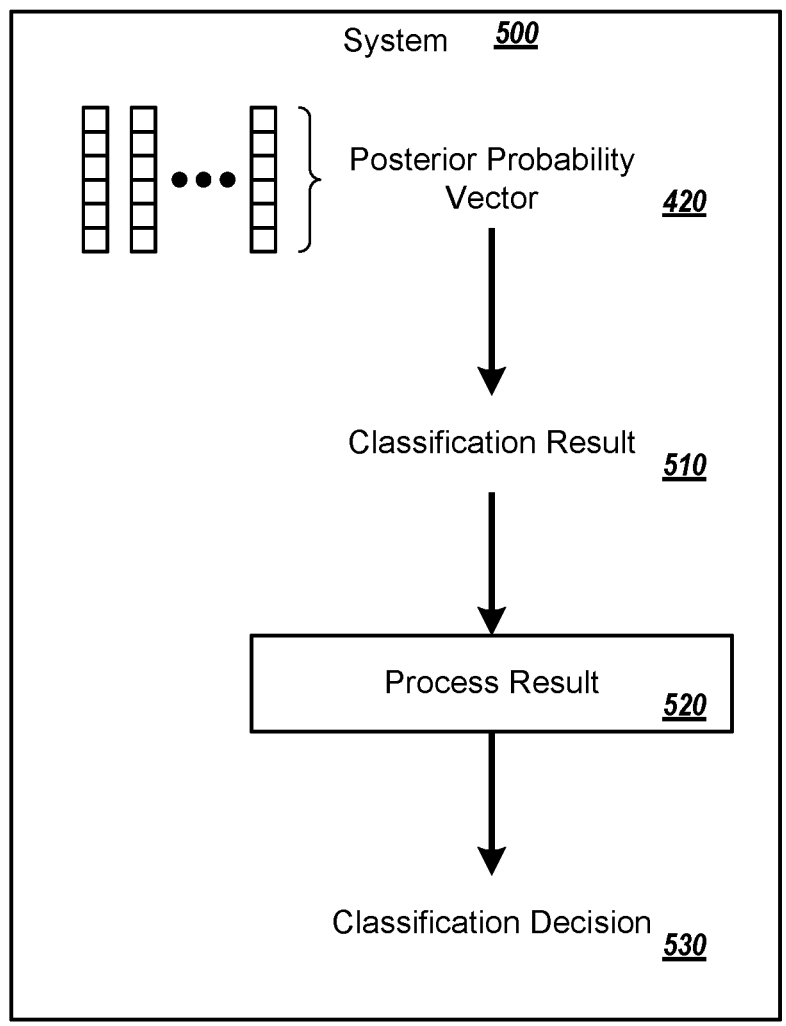
FIG. 5 is a block diagram of an example system for determining when an audio waveform contains a digital representation of a keyword or key phrase.

The coarse acoustic modeling module 210a provides the posterior probability vectors 214a to a coarse posterior handling module 212a that uses the posterior probability vectors 214a to determine a posterior probability, and potentially a confidence score, that indicates whether a keyword or a key phrase is present in the corresponding audio waveform, as describe with reference to FIG. 5.

When the coarse posterior handling module 212a determines that a particular probability vector A 214a does not satisfy a first threshold, the coarse acoustic modeling module 210a continues to analyze additional feature vectors 206 received from the front-end feature extraction module 204 and the feature vector 206, used to generate the particular probability vector A 214a, is removed from the buffer 208, e.g., the values of the feature vector 206 are overwritten with a new feature vector or the buffer 208 is erased.

When the coarse posterior handling module 212a determines that a particular probability vector A 214a satisfies the first threshold, the system 200 provides the feature vector 206 from the buffer 208 to another acoustic modeling module 210b, which is more accurate than the coarse acoustic modeling module 210a, and is also described with reference to FIG. 4. The other acoustic modeling module 210b analyzes the feature vector 206 and produces another posterior probability vector B 214b that is representative of whether or not the corresponding portions of the audio waveform 202 contain the same specific words or phrases for which the coarse acoustic modeling module 210a is programmed.

The other acoustic modeling module 210b then provides the other posterior probability vector B 214b to another posterior handling module 212b, described with reference to FIG. 5, that determines whether the other posterior probability vector B 214b satisfies a second threshold, which is potentially more restrictive than the first threshold. The other posterior handling module 212b may be the same module, e.g., programming code, as the coarse posterior handling module 212a, but with more restrictive parameters, e.g., the second threshold. For instance, the posterior handling module 212 may receive a probability vector and a threshold value as input and the threshold value indicates whether the posterior handling module 212 is the coarse posterior handling module 212a or the other posterior handling module 212b.

A first threshold value of 0.1 may be used by the coarse posterior handling module 212a and a second, more restrictive threshold value of 0.2 may be used by the other posterior handling module 212b. For instance, the values in the posterior probability vectors 214a-b may be values between zero and one, inclusive, where higher values indicate a higher probability of a feature vector corresponding with a particular key phrase. When one of the values in a posterior probability vector is greater than the corresponding threshold, depending on which posterior handling module is analyzing the probability vector, the respective posterior handling module determines that the posterior probability vector satisfies the corresponding threshold. In some examples, the threshold values may be maximum values such that a value in a posterior probability vector must be less than the threshold value to satisfy the threshold value.

If the other posterior probability vector B 214*b* satisfies the second threshold, the system 200 may analyze additional input, e.g., from the audio waveform 202, for user commands. For instance, the system 200 may determine that the audio waveform 202 included a predetermined key phrase, e.g., "Okay Google," and may analyze the audio waveform 202 for commands indicated by a user, such as a request for driving directions, contact information, or details of a calendar appointment.

Various system embodiments are similar in their overall structure. They include modules that use similar architectures to accomplish similar goals: 1) front-end feature extraction, 2) acoustic modeling, and 3) posterior handling.

Figure 3:
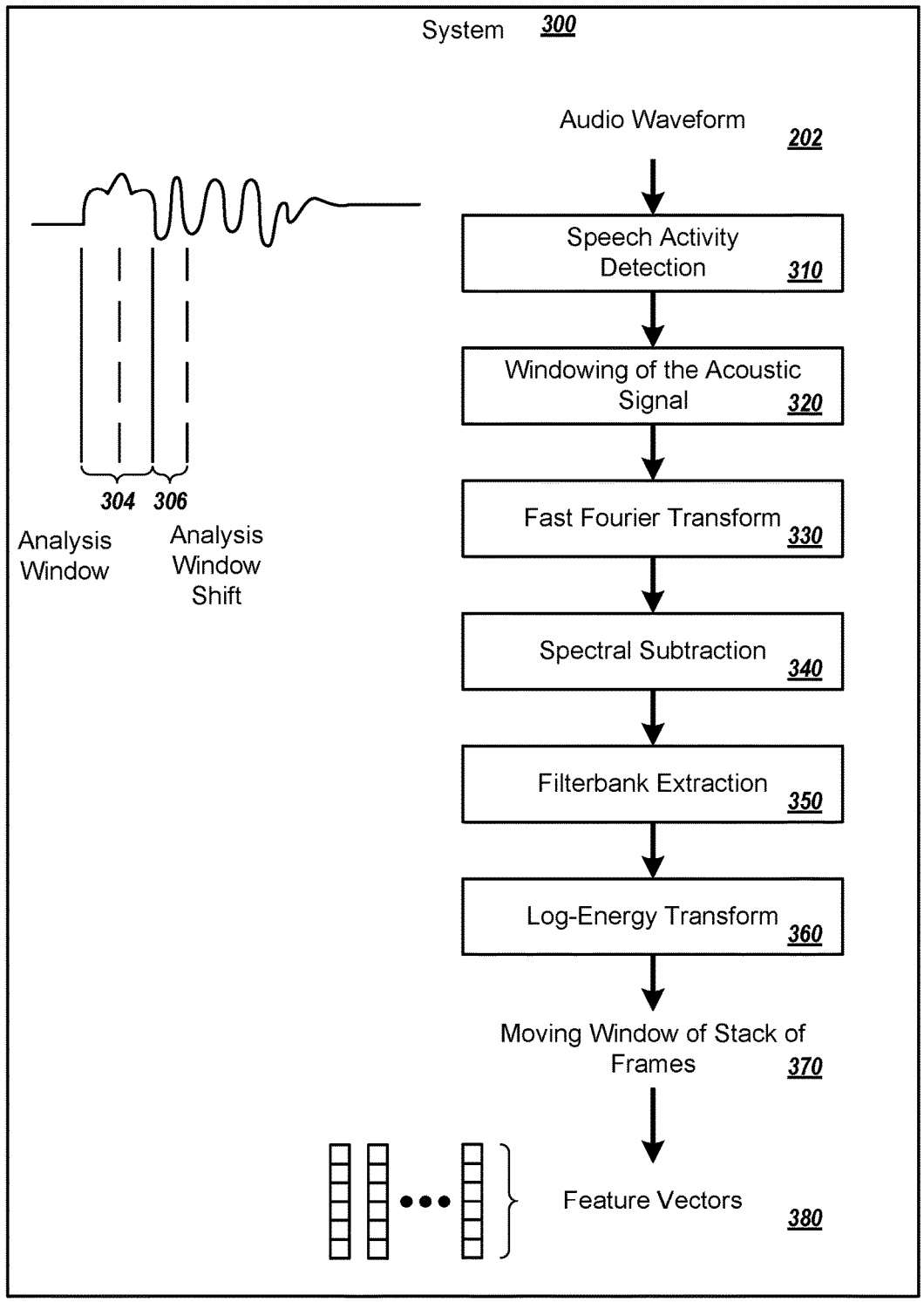
FIG. 3 is a block diagram of an example system for a feature extraction process.

FIG. 3 is a block diagram of an example system 300 for a feature extraction process. For example, the front-end feature extraction module 204 may receive the audio waveform 202. The front-end feature extraction module 204 may analyze the audio waveform 202 by dividing the audio waveform 202 into a plurality of windows and analyzing each of the windows, e.g., separately. For example, the front-end feature extraction module 204 may identify an analysis window 304 with a specific size, e.g., a 25 ms time period, for the audio waveform 202. The front-end feature extraction module 204 may obtain multiple analysis windows in succession by performing an analysis window shift 306, for example a 10 ms time period shift.

One or more analysis windows may overlap. For example, one analysis window may represent audio waveform 202 from a start time of 0 ms to an end time of 25 ms and a subsequent analysis window may represent audio waveform 202 from a start time of 10 ms to an end time of 35 ms.

The analysis windows 304 are obtained as part of speech activity detection 310, in which the system 300 obtains information about available sound in its environment, e.g., the physical environment surrounding a microphone that captured the audio waveform 202. Speech activity detection 310 may occur regardless of whether there is sound in the surrounding environment, or speech activity detection 310 may occur only when the system 300 detects a volume of sound greater than a threshold volume, e.g., in the audio waveform 202.

Once speech activity detection 310 occurs, the front-end feature extraction module 204 creates a plurality of acoustic windows from the acoustic signal 320. In some implementations, each window may have a short time interval, such as 25 ms, that represents characteristics of audio waveform 202 over that time interval.

After windowing, the front-end feature extraction module 204 may perform a Fourier transform 330 on the windowed data to analyze the constituent frequencies present in the audio waveform. The Fourier transform 330 may be a short-term Fourier transform or a Fast Fourier transform, to name a few examples.

In some implementations, the front-end feature extraction module 204 may perform spectral substitution 340 to minimize the noise in the windowed data, e.g., the transformed windowed data. The spectral substitution may minimize any potential negative effects of noise in the audio waveform 202 during later processing.

The front-end feature extraction module 204 may perform filter bank extraction 350 to separate individual components of the audio data from one another. Each of the individual components generated during filter bank extraction 350 may carry a single frequency sub-band of the audio waveform 202 or the windowed data.

In some implementations, the front-end feature extraction module 204 performs a log-energy transform 360 on the received data to normalize the data, e.g., the windowed data. The normalization of the data may enhance relevant features in the data that are used in subsequent processing.

The front-end feature extraction module 204 generates a moving window of a stack of frames 370. The stack of frames 370 may include eleven frames, each including data represent 25 ms of the audio waveform 202, with a shift of 10 ms between consecutive frames. The stack of frames 370 may include as few as two frames or any larger number of frames, such as fifty frames. The size of the stack of frames 370 may depend on the length of the keyword, key phrase, or acoustic unit predicted by the system 200.

The front-end feature extraction module 204 generates a plurality of feature vectors 380 that represent acoustic features of frames from the audio waveform 202 by performing the aforementioned analytical techniques to obtain information about characteristics of the audio waveform 202 for successive time intervals.

Figure 4:
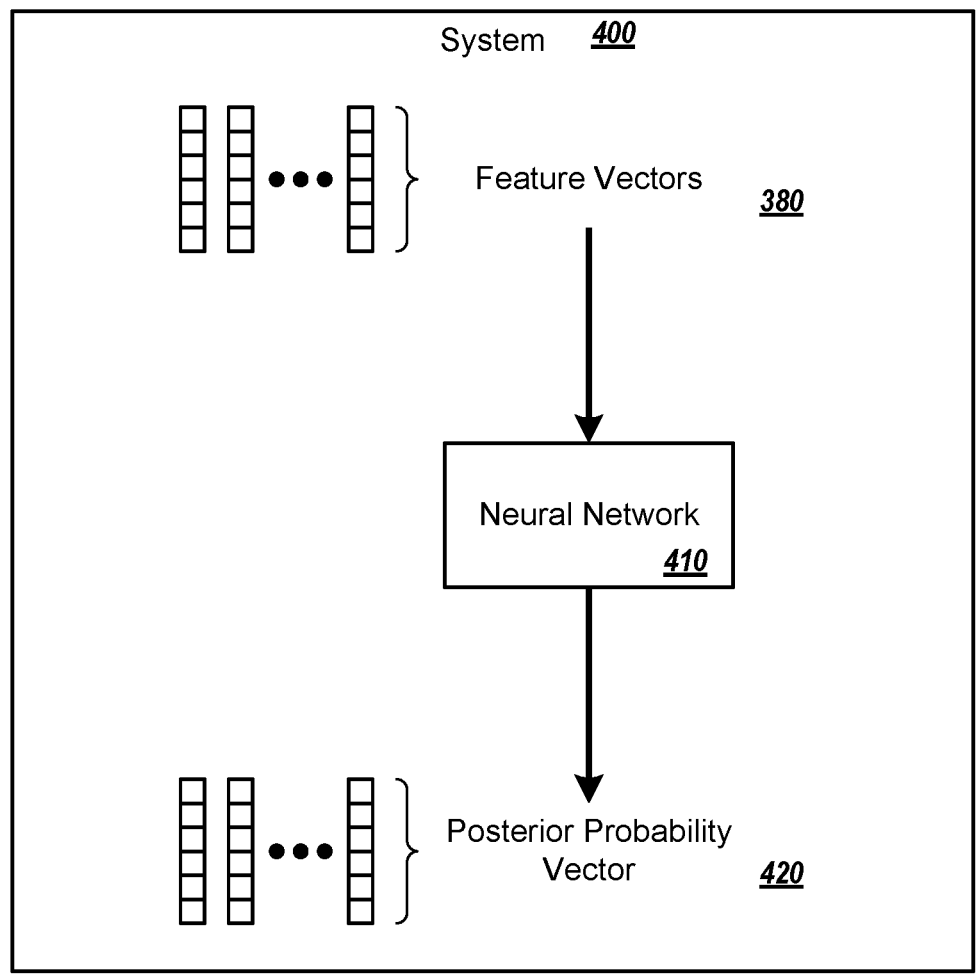
FIG. 4 is a block diagram of an example system for determining a posterior probability vector.

FIG. 4 is a block diagram of an example system 400 for determining a posterior probability vector. The acoustic modeling module 210*a-b*, shown in FIG. 1, receives the plurality of feature vectors 380 from the front-end feature extraction module 204 and generates a corresponding posterior probability vector 420 for each of the feature vectors 380. For a particular feature vector, the corresponding posterior probability vector 420 includes a value for each of the keywords or key phrases for which the speech recognition system is trained. The value indicates the probability that the frame represented by the feature vector includes at least a portion of a digital representation of speech of the corresponding keyword or key phrase.

The acoustic modeling module 210*a-b* includes a neural network 410, such as the coarse deep neural network 104 or the deep neural network 108 described with reference to FIG. 1, that generates the corresponding set of posterior probability vectors 420, where each of the posterior probability vectors 420 corresponds with one of the feature vectors 380.

The acoustic modeling module 210*a-b* may be trained to determine whether a stack of feature vectors matches a keyword or key phrase. For example, the neural network 410 may receive a training set of two expected event vectors for the keywords "Okay" and "Google" or one expected event vectors for the key phrase "Okay Google". As discussed above, the neural network 410 may be trained with a first, general training set and a second, specific training set, e.g., where the second training set includes the expected event vectors for the keywords "Okay" and "Google" or the one expected event vector for the key phrase "Okay Google".

In this example, the acoustic modeling module 210*a-b* processes each of the feature vectors 380 using the neural network 410 to determine if properties of the feature vector match the properties of the expected event vectors for the keywords "Okay" and "Google" and generates a posterior probability for each of the expected event vectors where the posterior probability is representative of the similarity of the properties. For instance, a higher score may represent a greater similarity between a feature vector and an expected event vector compared to a lower score. In some examples, a lower score may represent a greater similarity between a feature vector and an expected event vector compared to a higher score.

When the acoustic modeling module 210a-b processes a first feature vector and the acoustic modeling module 210a-b is programmed to identify two keywords, "Okay" and "Google," a first posterior probability vector corresponding to the first feature vector includes at least two posterior probability scores, one for each of the keywords. Each of the posterior probability scores represents the degree of acoustic match between the first feature vector and the expected event vectors. The acoustic modeling module may use Equation (2) above to determine a posterior probability, e.g., when the acoustic modeling module performs smoothing of the posterior probability scores.

For example, when the first feature vector is associated with the spoken word "Okay," the scores for "Okay" and "Google" may be 1.0 and 0.0 respectively. In some examples, when the first feature vector is associated with the spoken word "Search," the scores for "Okay" and "Google" are both 0.0. In some examples, when the first feature vector is associated with the spoken word "Google," the scores for "Okay" and "Google" are 0.0 and 0.95 respectively, e.g., when there may be a potentially small difference between the first feature vector and the expected event vector for "Google".

In implementations where the neural network 410 is the coarse deep neural network 104, when a feature vector is associated with the spoken word "Froogle," the scores for "Okay" and "Google" may be 0.0 and 0.93 respectively, as the coarse deep neural network 104 is unable to significantly differentiate between different words with similar pronunciations. In these implementations, the scores for "Okay" and "Google" generated by the deep neural network 108 for a feature vector associated with the spoken word "Froogle" may be 0.0 and 0.05 respectively.

In some implementations, the posterior probability vector 420 may include a "non-keyword" or "filler" posterior probability score. For example, the filler score for a feature vector associated with the spoken word "Okay" would be 0.0 and the filler score for the spoken word "Search" may be 1.0 when the acoustic modeling module 210a-b includes only two keywords, "Okay" and "Google." In these implementations, when the acoustic modeling module 210a-b is programmed to identify two keywords, the first posterior probability vector 420 includes at least three scores.

In some implementations, a sum of the posterior probability scores in a posterior probability vector 420 is 1.0. For example, the sum of the posterior probability scores for the spoken word "Okay" would be 1.0 (the "Okay" keyword score)+0.0 (the "Google" keyword score)+0.0 (the filler score)=1.0 and the sum of the scores for the spoken word "Google" may be 0.0 (the "Okay" keyword score)+0.95 (the "Google" keyword score)+0.05 (the filler score)=1.0.

The posterior probability scores may represent the confidence of the acoustic modeling module 210a-b that the acoustic properties of a feature vector match an expected event vector. In some examples, when the acoustic modeling module 210a-b identifies a match between a feature vector and an expected event vector, the corresponding posterior probability score might not be 1.0 based on a variance between the feature vector and the expected event vector, such as with the example for the spoken word "Google" above.

In some implementations, the acoustic modeling module 210a-b may determine a confidence score from a posterior probability score or multiple posterior probability scores. For example, the acoustic modeling module 210a-b may determine a confidence score using Equation (3) above.

In some implementations, an expected event vector may represent a key phrase. For example, a first expected event vector may correspond with the key phrase "Okay Google" and a second expected event vector may correspond with the keyword "Google." In this example, when the acoustic modeling module 210a-b receives a feature vector for the spoken phrase "Okay Google," the posterior probability score for the key phrase "Okay Google" may be 0.7 and the posterior probability score for the key phrase "Google" may be 0.3.

In some implementations, the acoustic modeling module scores a key phrase based on the order of the words or sub-word units in the key phrase. For example, when a key phrase includes the sub-word units "oh," "kay," "g$\overline{oo}$," and "gə1," the acoustic modeling module 210a-b determines whether a continuous sequence of four feature vectors acoustically match the expected event vectors for the sub-word units "oh," "kay," "g$\overline{oo}$," and "gə1," and assigns a posterior probability score to the sequence of feature vectors accordingly. The acoustic modeling module 210a-b may generate a posterior probability vector for each set of four continuous feature vectors where the posterior probability vector includes scores that represent the similarity of the feature vectors to the key phrase and any other keywords or key phrases for which the acoustic modeling module 210a-b is trained. If the acoustic modeling module 210a-b identifies four feature vectors that are similar to the sub-word units "oh," "kay," "g$\overline{oo}$," and "gə1" but in a different order, the corresponding score in a posterior probability vector is low, e.g., 0.0.

In some implementations, the acoustic modeling module 210a-b may be trained to identify words or phrases spoken by a particular user. For example, the acoustic modeling module 210a-b may be trained to identify a pronunciation of the particular user speaking keywords or key phrases such that when a different user speaks the specific keywords or key phrases, the acoustic modeling module 210a-b generates low keyword posterior probability scores for the keywords or key phrases spoken by the different user, e.g., 0.0. In these implementations, the training data for the acoustic modeling module 210a-b may include data representing the specific keywords spoken by the particular user and data representing the specific keywords spoken by different users. For instance, the second training set may include examples of the keywords and key phrases spoken by the particular user, e.g., as positive examples, and keywords and key phrases spoken by other users, e.g., as negative examples.

FIG. 5 is a block diagram of an example system 500 for determining when an audio waveform contains a digital representation of a keyword or key phrase. For example, the posterior handling module 212a-b receives the posterior probability vector 420 from the corresponding acoustic modeling module 210a-b. In some examples, the posterior handling module 212a-b may use support vector machine or logistic regression to make a binary decision about whether a keyword or a key phrase was uttered during a time window of the audio waveform 202 that is associated with the posterior probability vector 420.

The posterior handling module 212a-b produces classification result 510. This may be an actual classification decision 530, in terms of a Boolean decision confirming that a keyword or a key phrase was present in the audio waveform 202 or not.

In some implementations, the classification result 510 may be a posterior probability score and/or a confidence score, e.g., for a particular one of the keywords or key phrases. For example the posterior probability score may represent the likelihood that a keyword or a key phrase is present in the audio waveform 202 or a frame from the audio waveform 202. If classification result 510 is a posterior probability score, e.g., and not a binary value, the posterior handling module 212a-b may process the result 520 to generate the classification decision 530, for example, by comparing the classification result 510 with a threshold value.

In some implementations, the posterior handling module 212a-b combines corresponding posterior probability scores from multiple posterior probability vectors 420 to determine whether a keyword or key phrase was uttered during a time window of the audio waveform 202. For example, the posterior handling module 212a-b may average twenty posterior probability scores associated with the keyword "Google" from twenty consecutive posterior probability vectors and use the average, e.g., as a single posterior probability for a time period, to determine whether "Google" was spoken during the time period that corresponds with the twenty consecutive posterior probability vectors. In this example, the posterior handling module 212a-b would also average the posterior probability scores for the other keywords or key phrases represented in the posterior probability vectors, such as the "Okay" keyword posterior probability scores and the filler posterior probability scores.

The posterior handling module 212a-b may use any appropriate window for the consecutive posterior probability scores. For example, the posterior handling module 212a-b may average the corresponding scores from eleven consecutive posterior probability vectors.

The posterior handling module 212a-b uses the combination of the posterior probability scores to determine whether the keyword or key phrase was spoken during the time window of the audio waveform 202. For example, the posterior handling module 212a-b determines whether the combination satisfies a predetermined threshold value and, if so, determines that the keyword or key phrase associated with the combined posterior probability scores was likely spoken during the time window of the audio waveform 202.

In some implementations, the posterior handling module 212a-b combines corresponding posterior probability scores from multiple posterior probability vectors 420 by determining a geometric mean, a sum, or a product of the scores.

In some implementations, the posterior handling module 212a-b determines a maximum value of the posterior probability scores corresponding to a particular keyword or key phrase as the combination of the posterior probability scores. For example, the posterior handling module 212a-b may determine a maximum posterior probability score value from one-hundred consecutive posterior probability vectors 420 and use the maximum value when determining whether the audio waveform 202 includes the keyword or key phrase. In some examples, when the maximum value is greater than a predetermined threshold, the posterior handling module 212a-b determines that the keyword or key phrase was included in the audio waveform 202. Similarly, the posterior handling module 212a-b may determine whether a minimum value is less than another predetermined threshold value to identify when a keyword or key phrase is included in the audio waveform.

The posterior handling module 212a-b may move a window and/or may use windows of different sizes when determining whether a keyword or key phrase was spoken during a different portion of the audio waveform 202. For example, the posterior handling module 212a-b may look at different overlapping or non-overlapping windows and determine a combination of the posterior probability scores for the different window.

In some implementations, the posterior handling module 212a-b enforces the order of words or sub-word units associated with keywords or key phrases. For example, when the acoustic modeling module generates posterior probability scores for words that are portions of a key phrase, the posterior handling module 212a-b determines whether the portions of the key phrase occurred in the correct order when determining whether the key phrase was recorded in the audio waveform 202.

For example, when the key phrase is "Okay Google" and the posterior handling module 212a-b receives a first posterior probability vector with a score of 1.0 for "Okay" and a second posterior probability vector with a score of 1.0 for "Google," where the first posterior probability vector corresponds with a portion of the audio waveform immediately prior to the portion of the audio waveform that corresponds with the second posterior probability vector without any intermediate portions, the posterior handling module 212a-b determines that the key phrase "Okay Google" was recorded in the audio waveform 202. The posterior handling module 212a-b may perform a similar process for portions of keywords, such as "goo" and "gle" or "g$\overline{oo}$" and "g$\partial$l".

In some examples, when the posterior handling module 212a-b determines that a first posterior probability vector has a score of 1.0 for "Google" and a second posterior probability vector has a score of 1.0 for "Okay," where the second posterior probability vector corresponds with a later portion of the audio waveform 202 than the first posterior probability vector and/or at least one feature vector corresponds with a portion of the audio waveform 202 between the portions of the audio waveform that correspond with the first and second posterior probability vectors. In these examples, the posterior handling module 212a-b determines that the key phrase "Okay Google" was not recorded in those portions of the audio waveform 202.

Figure 6:
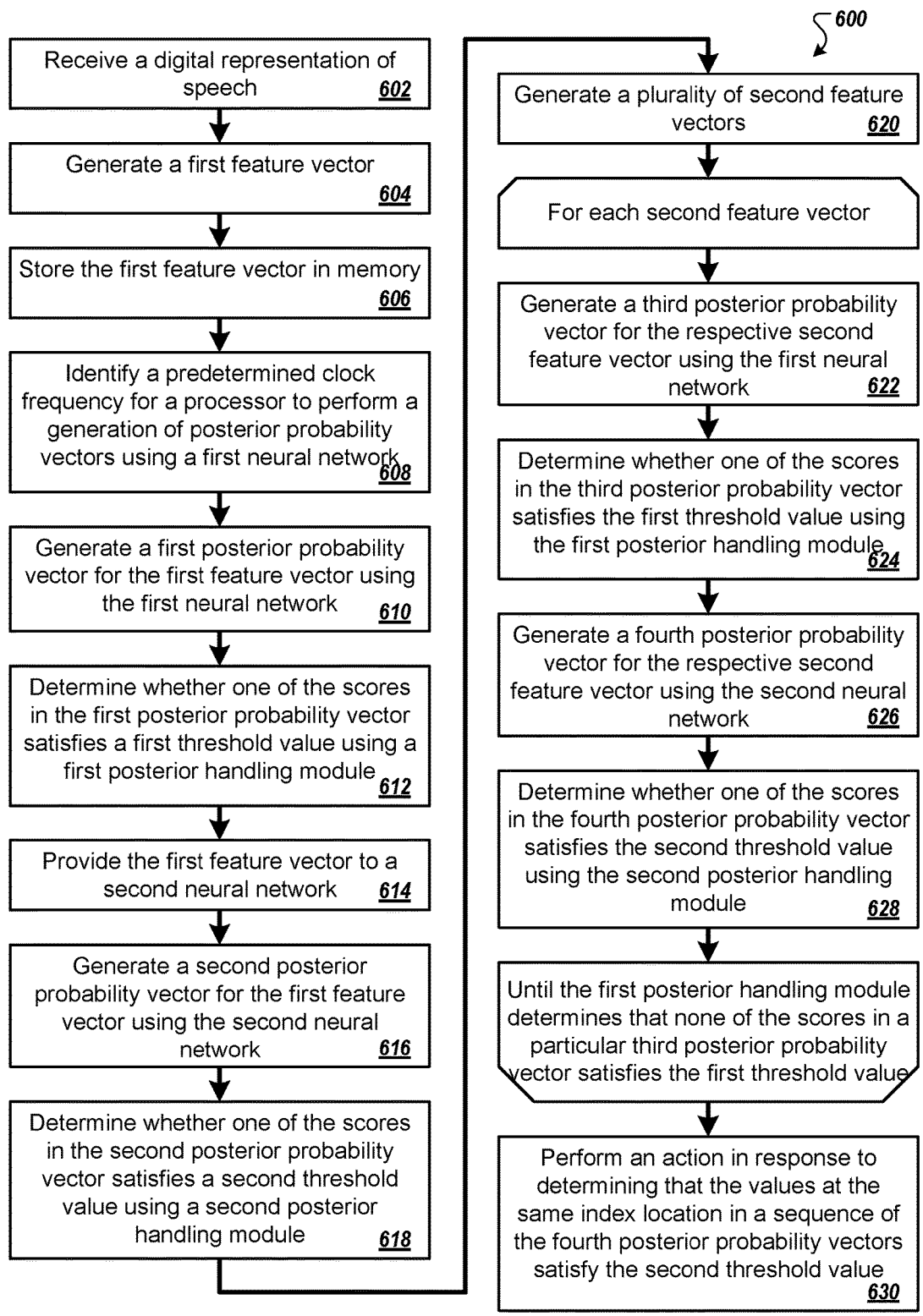
FIG. 6 is a flow diagram of an example process for analyzing a feature vector with a first neural network and determining whether to analyze the feature vector with a second neural network.

FIG. 6 is a flow diagram of an example process 600 for analyzing a feature vector with a first neural network and determining whether to analyze the feature vector with a second neural network. For example, the process 600 can be performed by the system 200.

The process receives a digital representation of speech (602). For instance, a microphone records the digital representation of speech that may include words spoken by one or more users and/or ambient sound.

The process generates a first feature vector (604) using the digital representation of speech. For example, a front-end feature extraction module analyzes the digital representation of speech to generate the first feature vector. The front-end feature extraction module may execute on a user device.

The process stores the first feature vector in memory (606). For example, the front-end feature extraction module stores the first feature vector in a buffer in the memory.

The process identifies a predetermined clock frequency for a processor to perform a generation of posterior probability vectors using a first neural network (608). For instance, the predetermined clock frequency may be selected to reduce CPU usage and/or power consumption on a user device and/or extend a battery life of the user device.

The predetermined clock frequency may be identified by the first neural network, e.g., based on a power savings ratio with the second neural network. For example, the clock frequency may be set to 10% of the clock frequency used for the second neural network to provide a power consumption savings of 90%. In some examples, when a quantity of nodes included in the first neural network is 10% a quantity of nodes in the second neural network, the first neural network may provide a power consumption savings of 90%, e.g., since the first neural network will require only 10% of the power used by the second neural network to analyze a feature vector.

In some implementations, a digital signal processor executes the first neural network. Another processor, different from the digital signal processor, may execute the front-end feature extraction module, the second neural network, the first posterior handling module, and/or the second posterior handling module.

The process generates a first posterior probability vector for the first feature vector using the first neural network (610). For example, a coarse deep neural network generates the first posterior probability vector. The user device may execute the coarse deep neural network at the predetermined clock frequency when the first neural network generates the first posterior probability vector or anytime the first neural network generates a posterior probability vector.

The process determines whether one of the scores in the first posterior probability vector satisfies a first threshold value using a first posterior handling module (612). For example, a coarse posterior handling module, or a posterior handling module with a less restrictive threshold, may determine whether a score in the first posterior probability vector satisfies the first threshold value and indicates whether the first feature vector, and a corresponding audio waveform is likely to include at least a portion of a key phrase for which the first neural network is trained to identify.

When the first posterior handling module determines that none of the scores in the first posterior probability vector satisfy the first threshold value, the first feature vector is removed from the memory. For instance, since the first feature vector is not likely to include at least a portion of a key phrase for which the first neural network is trained, the first feature vector may be overwritten, e.g., with a second feature vector.

The process provides the first feature vector to a second neural network (614) from the memory. For instance, the second neural network receives a message, e.g., from the coarse posterior handling module, indicating that the second neural network should retrieve the first feature vector from memory or the second neural network receives the first feature vector from another module. The second neural network does not analyze any feature vectors until the first posterior handling module determines that the feature vector satisfies the first threshold value. The process may use any appropriate method to provide the second neural network with an indication that the second neural network should retrieve the first feature vector from memory.

The process generates a second posterior probability vector for the first feature vector using the second neural network (616). The second neural network is trained to identify the same key phrases as the first neural network but includes more nodes than the first neural network and is accurate than the first neural network.

The process determines whether one of the scores in the second posterior probability vector satisfies a second threshold value using a second posterior handling module (618). The second posterior handling module may be more restrictive than the first posterior handling module, e.g., the second threshold value may be more restrictive than the first threshold value.

The process generates a plurality of second feature vectors (620) using the digital representation of speech. For instance, when the second neural network generates the second posterior probability vector and/or the second posterior handling module compares the second posterior probability vector with the second threshold value, the front-end feature extraction module generates at least some of the second feature vectors.

For each second feature vector, the process generates a third posterior probability vector for the respective second feature vector using the first neural network (622). For example, after the first posterior handling module determines that at least one of the scores in the first posterior probability vector satisfies the first threshold value, the first neural network generates third posterior probability vectors, and the process performs steps 624 through 628, until the first posterior handling module determines that none of the scores in a particular third posterior probability vector satisfies the first threshold value.

During this time, e.g., until the first posterior handling module determines that none of the scores in a particular third posterior probability vector satisfies the first threshold value, the front-end feature extraction module may continuously store the values of the second features vectors in memory such that the second feature vectors are not overwritten or otherwise removed from memory. For instance, the second neural network may use multiple sequential second feature vectors when generating a particular posterior probability vector and may retrieve the multiple sequential second feature vectors from memory, e.g., a single buffer or multiple buffers. In some examples, the front-end feature extraction module may provide the second feature vectors to the second neural network.

The process determines whether one of the scores in the third posterior probability vector satisfies the first threshold value using the first posterior handling module (624).

The process generates a fourth posterior probability vector for the respective second feature vector using the second neural network (626) until the first posterior handling module determines that none of the scores in a particular third posterior probability vector satisfies the first threshold value.

The process determines whether one of the scores in the fourth posterior probability vector satisfies the second threshold value using the second posterior handling module (628).

The process performs an action in response to determining that the values at the same index location in a sequence of the fourth posterior probability vectors satisfy the second threshold value (630). For instance, a user device executing the front-end feature extraction module, the first neural network, and the first posterior handling module executes an application in response to the received digital representation of speech. The second neural network and the second posterior handling module may optionally execute on the user device or on a device remote from the user device, e.g., a server.

The action performed by the user device may correspond with the values in the fourth posterior probability vectors that satisfy the second threshold value. For instance, the receipt of the key phrase "Okay Google" may cause the user device to wake from a standby state and the receipt of "Google directions" may cause the user device to launch an application, e.g., a map application.

The user device may perform speech recognition on a portion of the digital representation of speech using another neural network or acoustic modeling module, e.g., the portion of the digital representation of speech after the portion identified by the second posterior handling module that satisfies the second threshold value. For example, user device may use the speech recognition to determine a command provided by a user, e.g., after a key phrase identified by the second neural network.

The order of steps in the process 600 described above is illustrative only, and the analysis of the feature vector with the first neural network and determination whether to analyze the feature vector with the second neural network can be performed in different orders. For example, a user device may identify the predetermined clock frequency, e.g., step 608, prior to receiving the digital representation of speech, e.g., step 602.

In some implementations, the process 600 can include additional steps, fewer steps, or some of the steps can be divided into multiple steps. For example, a user device may perform steps 602, 604, 610, 612, 616, and 618 without performing the other steps of the process 600.

In some implementations, the acoustic modeling module uses a neural network, e.g., a deep neural network, to generate the posterior probability vector. For example, the neural network may be trained, prior to the generation of the posterior probability vector, with a set of training feature vectors that includes the expected event vectors. In some examples, each of the set of training feature vectors includes properties of spoken sub-word units associated with keywords or key phrases. The training feature vectors includes the properties of the expected event vectors such that training with the expected event vectors teaches the neural network the combination of properties to identify that correspond with each of the expected event vectors and the sub-word units of the keywords and key phrases.

In some implementations, the set of training feature vectors comprises a plurality of general feature vectors where each of the general feature vectors is different from all of the expected event vectors and corresponds with words different from the keywords. For example, the general feature vectors include properties of sub-word units not included in any of the keywords or key phrases the acoustic modeling module identifies, e.g., general speech that does not include the keywords or key phrases. The neural network may use the general feature vectors to identify combinations of properties that are not associated with any of the expected event vectors, e.g., as negative training data. The negative training data may be associated with a filler category or posterior probability determined by the neural network.

Figure 7:
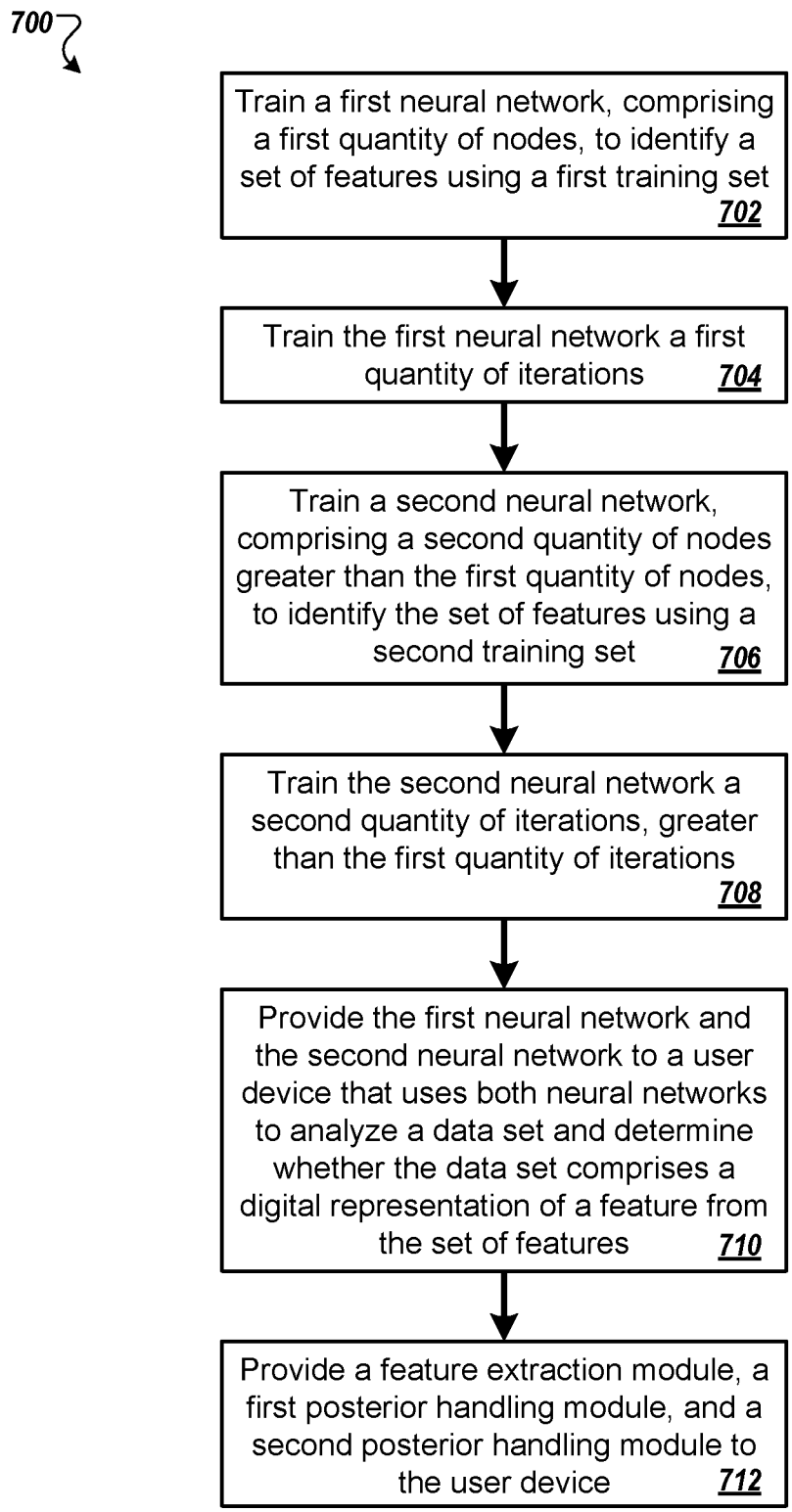
FIG. 7 is a flow diagram of a process for training two neural networks and providing the two neural networks to a user device.

FIG. 7 is a flow diagram of a process 700 for training two neural networks and providing the two neural networks to a user device. For example, the process 700 can be performed by a server that provides one or both of the neural networks to a user device that includes at least part of the system 200.

The process trains a first neural, comprising a first quantity of nodes, to identify a set of features using a first training set (702), for a first quantity of iterations (704). For example, a server trains the first neural network for the first quantity of iterations.

The process trains a second neural network, comprising a second quantity of nodes greater than the first quantity of nodes, to identify the set of features using a second training set (706), for a second quantity of iterations (708). The second quantity of iterations may be greater than the first quantity of iterations. For instance, the server trains the second neural network and may optionally use the same training set to train the second neural network as that used to train the first neural network.

The process provides the first neural network and the second neural network to a user device that uses both neural networks to analyze a data set and determine whether the data set comprises a digital representation of a feature from the set of features (710). For example, the user device may use the first and second neural networks for any type of pattern recognition, such as speech recognition; computer vision, e.g., to determine whether an image contains a predetermined pattern or another predetermined image; handwriting recognition; text classification; authentication, e.g., fingerprint analysis, face detection, face verification, voice detection, or voice verification; medical diagnosis; and traffic flow analysis.

The process may provide a feature extraction module, a first posterior handling module, and a second posterior handling module to the user device (712) with the first neural network and the second neural network. In some implementations, the first posterior handling module and the second posterior handling module are the same posterior handling module. For example, a single posterior handling module may be less restrictive when analyzing data as the first posterior handling module than when analyzing data as the second posterior handling module.

The order of steps in the process 700 described above is illustrative only, and the training of the two neural networks and providing of the two neural networks to the user device can be performed in different orders. For example, the system may train the second neural network prior to, or while, training the first neural network.

In some implementations, the process 700 can include additional steps, fewer steps, or some of the steps can be divided into multiple steps. For example, the system may provide the feature extraction module and a posterior handling module to the user device with the first and second neural networks. In some examples, the system provides the user device with only the first neural network, e.g., when a remote device, potentially the server that trained the neural networks, executes the second neural network.

Figure 8:
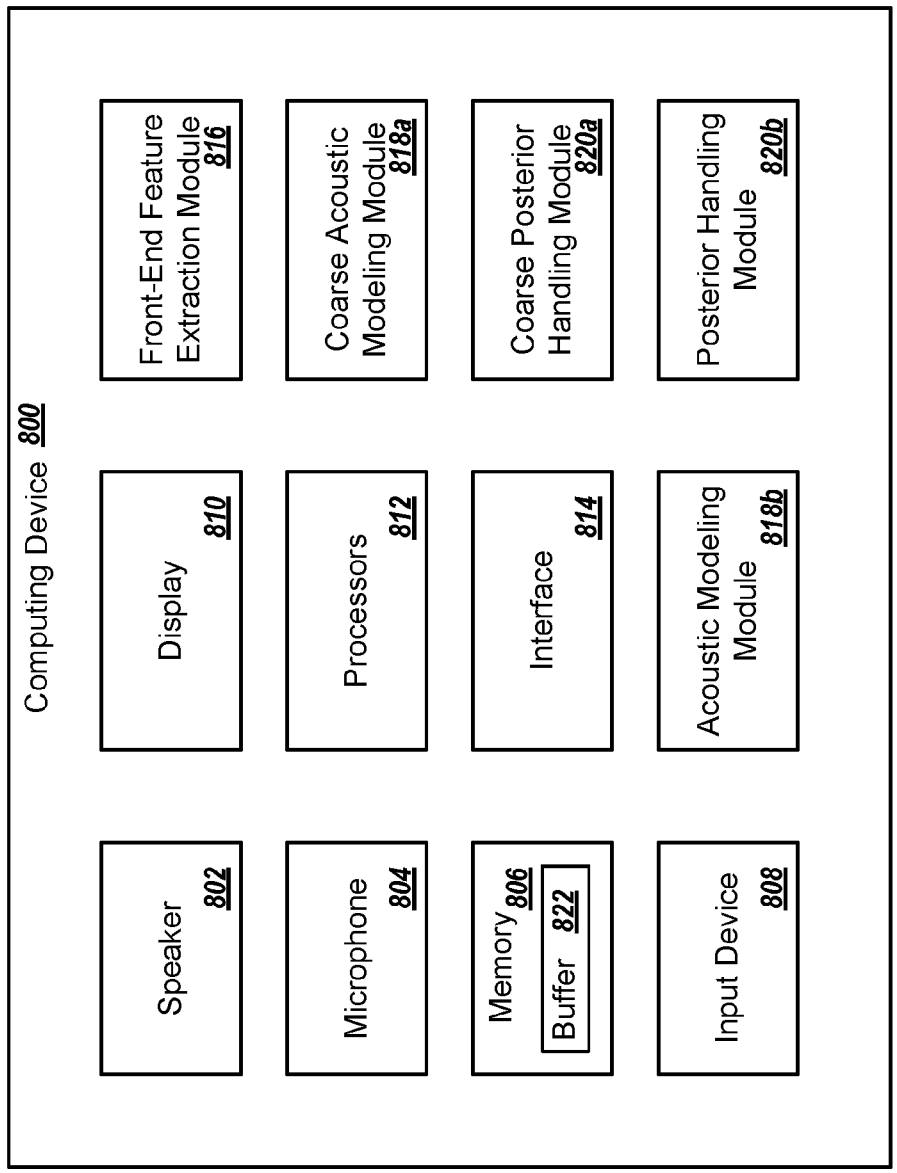
FIG. 8 is a block diagram of an example computing device that can detect keyword and key phrase utterances in an audio waveform.

FIG. 8 is a block diagram of an example computing device 800 that can detect keyword and key phrase utterances in an audio waveform. The computing device 800 contains a variety of constituent parts and modules that may be implemented through appropriate combinations of hardware, firmware, and software that allow the computing device 800 to function as an embodiment of appropriate features.

The computing device 800 contains one or more processors 812 that may include various hardware devices designed to process data. The processors 812 are communicatively coupled to other parts of computing device 800. For example, the processors 812 may be coupled to a speaker 802 and a microphone 804 that allow output and input of audio signals to and from an area that physically surrounds the computing device 800. The microphone 804 may provide the raw signals that capture aspects of the audio waveform 202 that are processed in other portions of the computing device 800.

The computing device 800 may include a memory 806. The memory 806 may include a variety of memory storage devices, such as persistent storage devices that allow permanent retention and storage of information manipulated by the processors 812. The memory 806 may include a buffer 822 in which the computing device 800 stores feature vectors analyzed by a coarse acoustic modeling module 818a prior to providing the feature vector to another acoustic modeling module 818b.

An input device 808 allows the receipt of commands by the computing device 800 from a user, and an interface 814 allows the computing device 800 to interact with other devices to allow the exchange of data. The processors 812 may be communicatively coupled to a display 810 that provides a graphical representation of information processed by the computing device 800 for the presentation to a user.

The processors 812 may be communicatively coupled to a series of modules that perform the functionalities necessary to implement the method of embodiments that is presented in FIG. 6. These modules include a front-end feature extraction module 816, which performs as described with reference to FIGS. 2 and 3, the coarse acoustic modeling module 818*a* and the other acoustic modeling module 818*b*, which perform as described with reference to FIGS. 2 and 4, and a coarse posterior handling module 820*a* and another posterior handling module 820*b*, which perform as described with reference to FIGS. 2 and 5.

The acoustic modeling modules 818*a*-*b* may use deep neural networks, e.g., described with reference to FIG. 1 above. For instance, the deep neural networks are specific to a particular set of keywords and key phrases and, for each input feature vector, output a posterior probability score vector with values for each of the keywords and key phrases.

As discussed above, the task of keyword detection is an important component in some speech recognition applications. For example, when the vocabulary size is limited, or when the task requires activating a device, for example, a phone, by saying a word, keyword detection is applied to classify whether an utterance contains a word or not and whether the word is a particular word or part of a phrase for which the device has been programmed to identify.

For example, the task performed by some embodiments includes detecting a single word, for example, "Google," that will activate a device from a standby mode to perform a task. The device continuously monitors received audio waveforms for the predetermined keywords and/or key phrases.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 9:
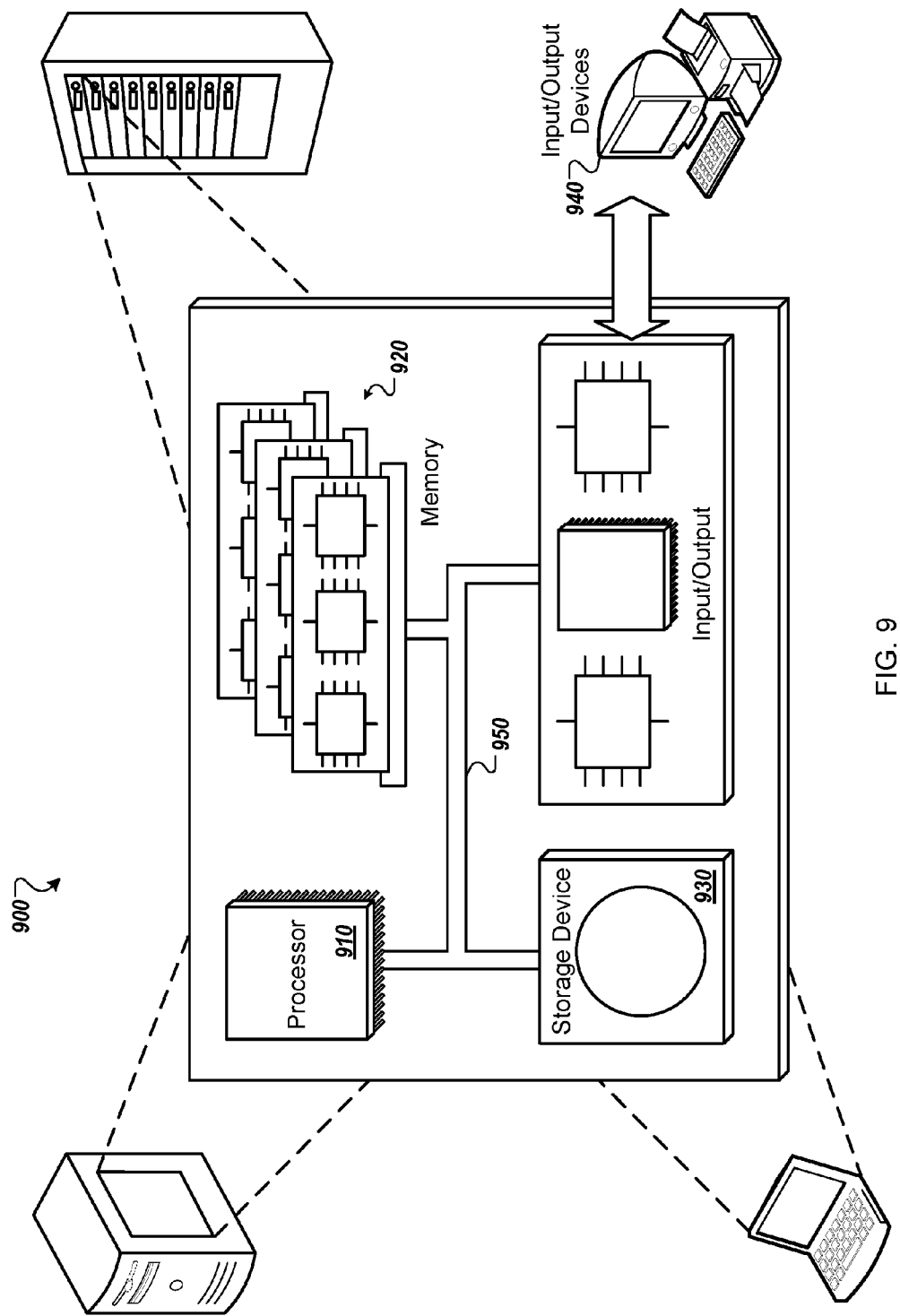
FIG. 9 is a block diagram of a computing system that can be used in connection with computer-implemented methods described in this document.

An example of one such type of computer is shown in FIG. 9, which shows a schematic diagram of a generic computer system 900. The system 900 can be used for the operations described in association with any of the computer-implement methods described previously, according to one implementation. The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
one or more computers and one or more storage devices storing instructions that are operable, when executed by the one or more computers, to cause the one or more computers to perform operations comprising:
training, using a first training set, a first neural network to identify a set of features within a first accuracy, the first neural network comprising a first quantity of hidden nodes and multiple first output nodes, wherein a quantity of the first output nodes includes one node for each feature in the set of features;
training, using a second training set, a second neural network to identify the set of features within a second accuracy that is a higher accuracy than the first accuracy, the second neural network being a different neural network than the first neural network and comprising a second quantity of hidden nodes that is a greater quantity of nodes than the first quantity of hidden nodes and multiple second output nodes, wherein a quantity of the second output nodes includes one node for each feature in the set of features and is the same quantity as the quantity of the first output nodes included in the first neural network; and providing the first neural network and the second neural network to a user device for use by a pattern recognition system, on the user device, that is configured to generate, using a data set as input to the first neural network with the first accuracy, a first confidence score that indicates a likelihood that the data set represents the presence of one or more features from the set of features and, upon determining that the first confidence score generated with the first neural network satisfies a threshold confidence score, the pattern recognition system on the user device is configured to generate, using the data set as input to the second neural network with the second accuracy, a second confidence score that indicates a likelihood that the data set represents the presence of one or more features from the set of features that the first neural network and the second neural network are both trained to identify.

2. The system of claim 1, wherein:

the set of features comprises key words and key phrases; and the pattern recognition system on the user device is configured to use both the first neural network and the second neural network to generate, using the data set that represents an audio waveform, confidence scores that each indicate a likelihood that a digital representation of one of the key words or the key phrases corresponding to the set of features is included in the audio waveform.

3. The system of claim 2, wherein the pattern recognition system is a spoken keyword detection system, and wherein the operations comprise:

providing a feature extraction module and at least one posterior handling module, with the first neural network and the second neural network, wherein the spoken keyword detection system on the user device is configured to (i) use the feature extraction module to generate the data set that represents the audio waveform by providing the audio waveform as input to the feature extraction module, (ii) use the at least one posterior handling module to generate the first confidence score using posterior probabilities generated by the first neural network, and (iii) use the at least one posterior handling module to generate the second confidence score using posterior probabilities generated by the second neural network.

4. The system of claim 3, wherein the at least one posterior handling module comprises a first posterior handling module and a second posterior handling module that is different from the first posterior handling module, wherein the spoken keyword detection system is configured to use the first posterior handling module to generate the first confidence score using posterior probabilities generated by the first neural network, and wherein the spoken keyword detection system is configured to use the second posterior handling module to generate the second confidence score using the posterior probabilities generated by the second neural network.

5. The system of claim 1, wherein the set of features comprise computer vision features, handwriting recognition features, text classification features, or authentication features.

6. The system of claim 1, wherein the first training set and the second training set comprise the same training set.

7. The system of claim 6, the operations comprising:

training the first neural network for a first quantity of iterations; and training the second neural network for a second quantity of iterations that is greater than the first quantity of iterations.

8. The system of claim 1, wherein a ratio between the first quantity of hidden nodes and the second quantity of hidden nodes was determined using a predicted performance cost savings for the user device when the pattern recognition system on the user device analyzes a particular portion of data with the first neural network and not the second neural network.

9. The system of claim 1, wherein a third quantity of input nodes in the first neural network is the same quantity as a fourth quantity of input nodes in the second neural network.

10. The system of claim 1, wherein providing the first neural network and the second neural network to the user device comprises providing the first neural network and the second neural network to a phone.

11. A method comprising:

training, using a first training set, a first neural network to identify a set of features within a first accuracy, the first neural network comprising a first quantity of hidden nodes and multiple first output nodes, wherein a quantity of the first output nodes includes one node for each feature in the set of features;

training, using a second training set, a second neural network to identify the set of features within a second accuracy that is a higher accuracy than the first accuracy, the second neural network being a different neural network than the first neural network and comprising a second quantity of hidden nodes that is a greater quantity of nodes than the first quantity of hidden nodes and multiple second output nodes, wherein a quantity of the second output nodes includes one node for each feature in the set of features and is the same quantity as the quantity of the first output nodes included in the first neural network; and providing the first neural network and the second neural network to a user device for use by a pattern recognition system, on the user device, that is configured to generate, using a data set as input to the first neural network with the first accuracy, a first confidence score that indicates a likelihood that the data set represents the presence of one or more features from the set of features and, upon determining that the first confidence score generated with the first neural network satisfies a threshold confidence score, the pattern recognition system on the user device is configured to generate, using the data set as input to the second neural network with the second accuracy, a second confidence score that indicates a likelihood that the data set represents the presence of one or more features from the set of features that the first neural network and the second neural network are both trained to identify.

12. The method of claim 11, wherein:

the set of particular features comprises key words and key phrases; and the pattern recognition system on the user device is configured to use both the first neural network and the second neural network to generate, using the data set that represents an audio waveform, confidence scores that each indicate a likelihood that a digital representation of one of the key words or the key phrases corresponding to the set of features is included in the audio waveform.

13. The method of claim 12, wherein the pattern recognition system is a spoken keyword detection system, and wherein the method comprises:

providing a feature extraction module and at least one posterior handling module, with the first neural network and the second neural network, wherein the spoken keyword detection system on the user device is configured to (i) use the feature extraction module to generate the data set that represents the audio waveform by providing the audio waveform as input to the feature extraction module, (ii) use the at least one posterior handling module to generate the first confidence score using posterior probabilities generated by the first neural network, and (iii) use the at least one posterior handling module to generate the second confidence score using posterior probabilities generated by the second neural network.

14. The method of claim 13, wherein the at least one posterior handling module comprises a first posterior handling module and a second posterior handling module that is different from the first posterior handling module, wherein the spoken keyword detection system is configured to use the first posterior handling module to generate the first confidence score using posterior probabilities generated by the first neural network, and wherein the spoken keyword detection system is configured to use the second posterior handling module to generate the second confidence score using the posterior probabilities generated by the second neural network.

15. The method of claim 11, wherein the set of features comprise computer vision features, handwriting recognition features, text classification features, or authentication features.

16. The method of claim 11, wherein the first training set and the second training set comprise the same training set.

17. The method of claim 16, comprising:
training the first neural network for a first quantity of iterations; and
training the second neural network for a second quantity of iterations, greater than the first quantity of iterations.

18. The method of claim 11, comprising selecting a ratio between the first quantity of hidden nodes and the second quantity of hidden nodes using a predicted performance cost savings for the user device when the pattern recognition system on the user device analyzes a particular portion of data with the first neural network and not the second neural network.

19. One or more non-transitory computer-readable media storing software comprising instructions executable by one or more computers which, upon such execution, cause the one or more computers to perform operations comprising:
training, using a first training set, a first neural network as a spoken keyword detection model to identify one or more predetermined words or phrases within a first accuracy, the first neural network comprising a first quantity of hidden nodes and multiple first output nodes, wherein a quantity of the first output nodes includes one node for each feature in a set of particular features;
training, using a second training set, a second neural network as a spoken keyword detection model to identify the one or more predetermined words or phrases within a second accuracy that is a higher accuracy than the first accuracy, the second neural network comprising a second quantity of hidden nodes that is a greater quantity of nodes than the first quantity of hidden nodes and multiple second output nodes, wherein a quantity of the second output nodes includes one node for each feature in the set of particular features and is the same quantity as the quantity of the first output nodes included in the first neural network; and
providing the first neural network and the second neural network to a user device for use by a spoken keyword detection system, on the user device, that is configured to generate, using a data set representing acoustic features of an audio signal as input to the first neural network with the first accuracy, a first confidence score that indicates a likelihood that the data set represents at least one of the one or more predetermined words or phrases and, upon determining that the first confidence score generated using the first neural network satisfies a threshold confidence score, the spoken keyword detection system on the user device is configured to generate, using the data set as input to the second neural network with the second accuracy, a second confidence score that indicates a likelihood that the data set represents the one of the predetermined words or phrases that both the first neural network and the second neural network are both trained to identify.

20. The one or more non-transitory computer-readable media of claim 19, the operations comprising:
providing a feature extraction module and at least one posterior handling module, with the first neural network and the second neural network, wherein the spoken keyword detection system on the user device is configured to (i) use the feature extraction module to generate a data set that represents an audio waveform by providing the audio waveform as input to the feature extraction module, (ii) use the at least one posterior handling module to generate the first confidence score using posterior probabilities generated by the first neural network, and (iii) use the at least one posterior handling module to generate the second confidence score using posterior probabilities generated by the second neural network.

21. The one or more non-transitory computer-readable media of claim 20, wherein the at least one posterior handling module comprises a first posterior handling module and a second posterior handling module that is different from the first posterior handling module, wherein the spoken keyword detection system is configured to use the first posterior handling module to generate the first confidence score using posterior probabilities generated by the first neural network, and wherein the spoken keyword detection system is configured to use the second posterior handling module to generate the second confidence score using the posterior probabilities generated by the second neural network.

* * * * *